US012771195B2

(12) United States Patent
Wen et al.

(10) Patent No.: US 12,771,195 B2
(45) Date of Patent: Oct. 20, 2026

(54) DUAL-ARMATURE FLUX-SWITCHING ELECTRICALLY EXCITED MACHINE

(71) Applicant: Zhejiang University of Science and Technology, Hangzhou (CN)

(72) Inventors: Hui Wen, Hangzhou (CN); Bingtuo Chen, Hangzhou (CN); Wenting Wang, Hangzhou (CN); Ranran Yan, Hangzhou (CN)

( * ) Notice: Subject to any disclaimer, the term of this patent is extended or adjusted under 35 U.S.C. 154(b) by 0 days.

(21) Appl. No.: 19/231,517

(22) Filed: Jun. 8, 2025

(65) Prior Publication Data

US 2025/0300511 A1 Sep. 25, 2025

(30) Foreign Application Priority Data

Aug. 29, 2024 (CN) ......................... 202411197660.3
Sep. 26, 2024 (CN) ......................... 202411345570.4

(51) Int. Cl.
*H02K 3/12* (2006.01)
*H02K 1/16* (2006.01)
(Continued)

(52) U.S. Cl.
CPC ................. *H02K 3/12* (2013.01); *H02K 1/16* (2013.01); *H02K 1/26* (2013.01); *H02K 19/10* (2013.01); *H02K 19/22* (2013.01)

(58) Field of Classification Search
CPC ............ H02K 1/16; H02K 1/165; H02K 1/17; H02K 1/26; H02K 1/265
See application file for complete search history.

(56) References Cited

U.S. PATENT DOCUMENTS

2003/0094929 A1 5/2003 Pendell
2012/0223600 A1* 9/2012 Tonogi .................. H02K 1/148 310/46

FOREIGN PATENT DOCUMENTS

CN 201188558 Y 1/2009
CN 201536282 U 7/2010
(Continued)

OTHER PUBLICATIONS

L. Wu, J. Zhu and Y. Fang, "A Novel Doubly-Fed Flux-Switching Permanent Magnet Machine With Armature Windings Wound on Both Stator Poles and Rotor Teeth," in IEEE Transactions on Industrial Electronics, vol. 67, No. 12, pp. 10223-10232, Dec. 2020, doi: 10.1109/TIE.2019.2959504. (Year: 2020).*
(Continued)

*Primary Examiner* — Tulsidas C Patel
*Assistant Examiner* — Robert E Mates

(57) ABSTRACT

The present disclosure relates to a dual-armature flux-switching electrically excited machine, including a stator and a rotor. The stator includes a stator core, field windings, and stator armature windings. The rotor includes rotor armature windings. When the windings are in a working state, the field windings are fed with a direct current, the stator armature windings and the rotor armature windings are fed with an alternating current, a current phase angle of the stator armature windings can be adjusted between 0° to 90°, and a current phase angle of each of the rotor armature windings can be adjusted between −90° to 0°. Through the dual-armature topology and the cooperation of the current phase angles of the armature windings, the torque density of the electrically excited machine is significantly improved.

9 Claims, 2 Drawing Sheets

(51) Int. Cl.
*H02K 1/26* (2006.01)
*H02K 19/10* (2006.01)
*H02K 19/22* (2006.01)

(56) References Cited

FOREIGN PATENT DOCUMENTS

| | | | |
|---|---|---|---|
| CN | 106787560 | A | 5/2017 |
| CN | 107453573 | A | 12/2017 |
| CN | 110429779 | A | 11/2019 |
| CN | 113489203 | A | 10/2021 |

OTHER PUBLICATIONS

CN 106787560A, to Wei et al., Issued May 31, 2017, English Abstract, 1 page.
CN 107453573A, to Ye et al., Issued Dec. 8, 2017, English Abstract, 1 page.
CN 110429779A to Jiang et al., Issued Nov. 8, 2019, English Abstract, 1 page.
CN 113489203A to Tang et al., Issued Oct. 8, 2021, English Abstract, 1 page.
Cn 201188558Y to Wei et al., Issued Jan. 28, 2009, English Abstract, 1 page.
CN 201536282U to Wei et al., Issued Jul. 28, 2010, English Abstract, 1 page.
"Analysis of the Field Windings Setting Pattern for the Novel Electrical Excitation Flux-switching Machine", Wang et al., Proceedings of the CSEE vol. 31, No. 24, Aug. 25, 2011, pp. 1-8.
CNIPA Notice of Patent Rights, Application No. 202411345570.4, dated Nov. 18, 2024, Chinese original, 1 page.
CNIPA Notice of Patent Rights, Application No. 202411345570.4, dated Nov. 18, 2024, English translation, 2 pages.

* cited by examiner

DUAL-ARMATURE FLUX-SWITCHING ELECTRICALLY EXCITED MACHINE

TECHNICAL FIELD

The present disclosure belongs to the technical field of machines, and in particular, to a dual-armature flux-switching electrically excited machine.

BACKGROUND

In recent years, interest in flux-switching permanent magnet machines, a kind of stator type permanent magnet machine, has been heating up. Compared with conventional surface-mounted permanent magnet machines, flux-switching permanent magnet machines feature considerable torque density, higher anti-demagnetization ability, better speed regulation ability, and simple rotor structure. However, this type of machine requires a large volume of permanent magnet materials. Current trends toward reduced-rare-earth or rare-earth-free devices, limit the potential of this type of machines.

Aiming at the above problems, many scholars consider using electrical exciting and hybrid exciting modes to reduce the need for permanent magnets in this type of machines. For example, J. T. Chen, Z. Q. Zhu et al of University of Sheffield, UK have proposed in their paper that in a novel flux-switching topological structure, the permanent magnets are replaced with DC field winding (Low cost flux-switching brushless AC machines, IEEE Vehicle Power and Propulsion Conference, 2010) to achieve a lower cost. Compared with similar permanent magnet machines, the electrically excited solution has the advantages of a complete lack of demagnetization risk, a wider speed regulation range, more flexible speed regulation, and the like. Moreover, compared with separated core structures in permanent magnet solutions, the difficulty of processing and assembling of integral stator structures is greatly reduced. Therefore, in specific scenarios, flux-switching electrically excited machines have a considerable potential for application.

Conventional flux-switching electrically excited machines mainly have the following shortcomings:

First, flux-switching electrically excited machines usually provide a constant magnetic field by means of DC field windings to realize a function equivalent to the permanent magnets in the permanent magnet machines. However, the magnetic field generated by direct current exciting currents is usually much weaker than the magnetic field provided by neodymium iron boron permanent magnets, which leads to a relatively low torque density of the flux-switching electrically excited machines. Although the magnetic field may be enhanced by increasing the exciting currents or the number of turns of direct current field windings, the electrical load and the thermal load of the machines will be significantly increased, which makes insulation design and cooling management of the machines extremely difficult.

Second, stator DC field windings and stator armature windings in flux-switching electrically excited machines have poor fault-tolerance. Once any one of the stator DC field windings or the stator armature windings fails, the machines cannot output torque. Although they are designed redundantly, for example, the armature windings are separated into two or more sets of spatially distributed, independently controlled windings to guarantee certain degree of fault-tolerant operation, properties such as torque output, efficiency, and operational stability of the machines deteriorate seriously, accompanied by many parasitic negative effects such as unbalanced forces and increased local eddy-current losses. In addition, the independently controlled multiple sets of windings mean that the cost of corresponding converter hardware is increased, and the control strategy is more complicated.

SUMMARY

Based on the above deficiencies and shortcomings existing in the prior art, one of the objectives of the present disclosure is to solve one or more of the above problems existing in the prior art flux-switching machines. In other words, one of the objectives of the present disclosure is to provide a dual-armature flux-switching electrically excited machine meeting one or more of the aforementioned requirements.

In order to achieve the purposes of the present disclosure described above, the present disclosure adopts the following technical solutions:

A dual-armature flux-switching electrically excited machine includes a stator and a rotor, where the stator includes a stator core, field windings, and stator armature windings, the stator core is provided with stator slots distributed along a circumference of the stator core, the stator slots include first stator slots and second stator slots, the second stator slots are provided on both sides of the first stator slots, the first stator slots are configured to accommodate the field windings, and the second stator slots are configured to accommodate the stator armature windings;

the rotor includes a rotor core and rotor armature windings, the rotor core includes rotor slots distributed along a circumference of the rotor core, and the rotor slots are configured to accommodate the rotor armature windings; and when the windings are in a working state, the field windings are fed with a direct current, the stator armature windings and the rotor armature windings are fed with an alternating current, a current phase angle of the stator armature windings is configured to be 0° to 90°, and a current phase angle of each of the rotor armature windings is configured to be −90° to 0°.

As a preferred solution, the current phase angle of the stator armature windings is configured to be 0° to 20°, and the current phase angle of each of the rotor armature windings is configured to be −60° to −30°.

As a preferred solution, a difference between the current phase angle of the stator armature windings and the current phase angle of each of the rotor armature windings is configured to be 40° to 70°.

As a preferred solution, the first stator slots are parallel slots, the second stator slots are non-parallel slots, and an area of each of the first stator slots is larger than an area of each of the second stator slots.

As a preferred solution, a copper loss of each of the field windings is greater than a copper loss of each of the stator armature windings, and a copper loss of each of the rotor armature windings is greater than the copper loss of each of the stator armature windings.

As a preferred solution, the copper loss of each of the field windings is equal to the copper loss of each of the rotor armature windings.

As a preferred solution, the adjacent stator slots are spaced by stator teeth, and the stator teeth are parallel teeth same in width; and a slot width of each of the first stator slots is greater than a tooth width of each of the stator teeth, and the tooth width of each of the stator teeth is greater than a maximum yoke thickness of the stator core.

As a preferred solution, the slot width of each of the first stator slots is greater than a maximum slot width of each of the second stator slots, and a slot notch width of each of the second stator slots is less than the tooth width of each of the stator teeth.

As a preferred solution, a depth of each of the first stator slots is greater than a depth of each of the second stator slots.

As a preferred solution, the adjacent rotor slots are spaced by rotor teeth, and the rotor teeth are parallel teeth; and a tooth tip width of each of the rotor teeth is greater than the slot width of each of the first stator slots.

As a preferred solution, when the rotor armature windings are disconnected and the field windings and the stator armature windings work, the current phase angle of the stator armature windings is configured to be 0°;

when the stator armature windings are disconnected and the field windings and the rotor armature windings work, the current phase angle of each of the rotor armature windings is configured to be 0°; and when the field windings are disconnected and the stator armature windings and the rotor armature windings work, the current phase angle of the stator armature windings is configured to be 0° to 20°, the current phase angle of each of the rotor armature windings is configured to be −60° to −30°, and the difference between the current phase angle of the stator armature windings and the current phase angle of each of the rotor armature windings is configured to be 40° to 70°.

Compared with the prior art, the present disclosure has the beneficial effects as follows:

Through dual-armature topology and current phase angle combination of the armature windings, the torque density of the flux-switching electrically excited machine is significantly improved. On this basis, through mutual cooperation of the current phase angles of each set of windings, the distribution of the copper losses of each set of windings, and special stator slot types, the torque density may further be increased. Compared with conventional flux-switching electrically excited machines, the copper losses generated by the machine are distributed on both sides of the stator and rotor. When the stator and rotor are both equipped with active cooling, a lower temperature rise and a more uniform temperature distribution will be obtained.

The dual-armature flux-switching electrically excited machine provided by the present disclosure has good fault-tolerant performance, which is mainly reflected in the following two aspects: first, without separating the windings and switching the types of the windings, even if the field windings fail, the machine can still operate. This structure provides the simplicity and economic efficiency of the system, and allows the fault-tolerant control logic to be relatively simple. Second, in any fault-tolerant operation mode, without changing the amplitude of the current, a considerable amount of torque output can be guaranteed, and negative effects such as extremely unbalanced radial stress and significantly aggravated torque fluctuations are avoided.

DETAILED DESCRIPTION OF THE EMBODIMENTS

In order to describe the embodiments of the present disclosure more clearly, specific implementations of the present disclosure will be described below with reference to the drawings. It will be apparent that the drawings described below are merely some embodiments of the present disclosure. Those of ordinary skill in the art can still obtain other drawings according to these drawings without creative labor and obtain other implementations.

Embodiment 1

Figure 1:
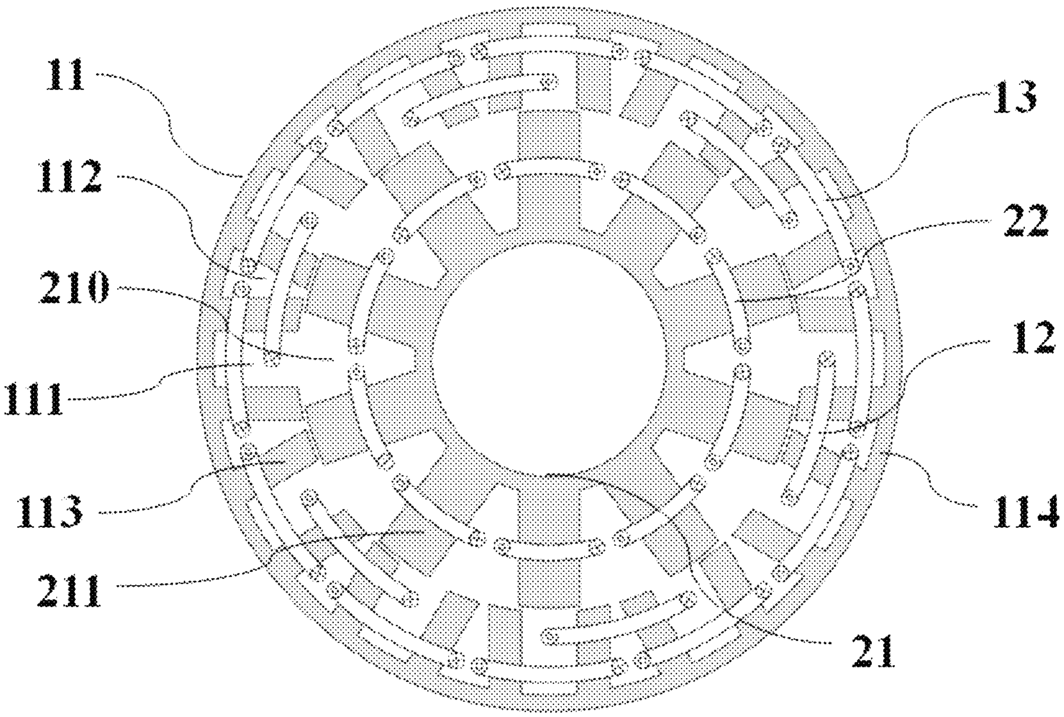
FIG. 1 is a schematic diagram of the topology of a dual-armature flux-switching electrically excited machine.

As shown in FIG. 1, the dual-armature flux-switching electrically excited machine in the embodiment is of a structure with an external stator and an internal rotor, specifically including a stator and a rotor. The stator includes a stator core 11 with a cogging structure, field windings 12, and stator armature windings 13. The rotor includes a rotor core 21 with a cogging structure, and rotor armature windings 22.

Figure 2:
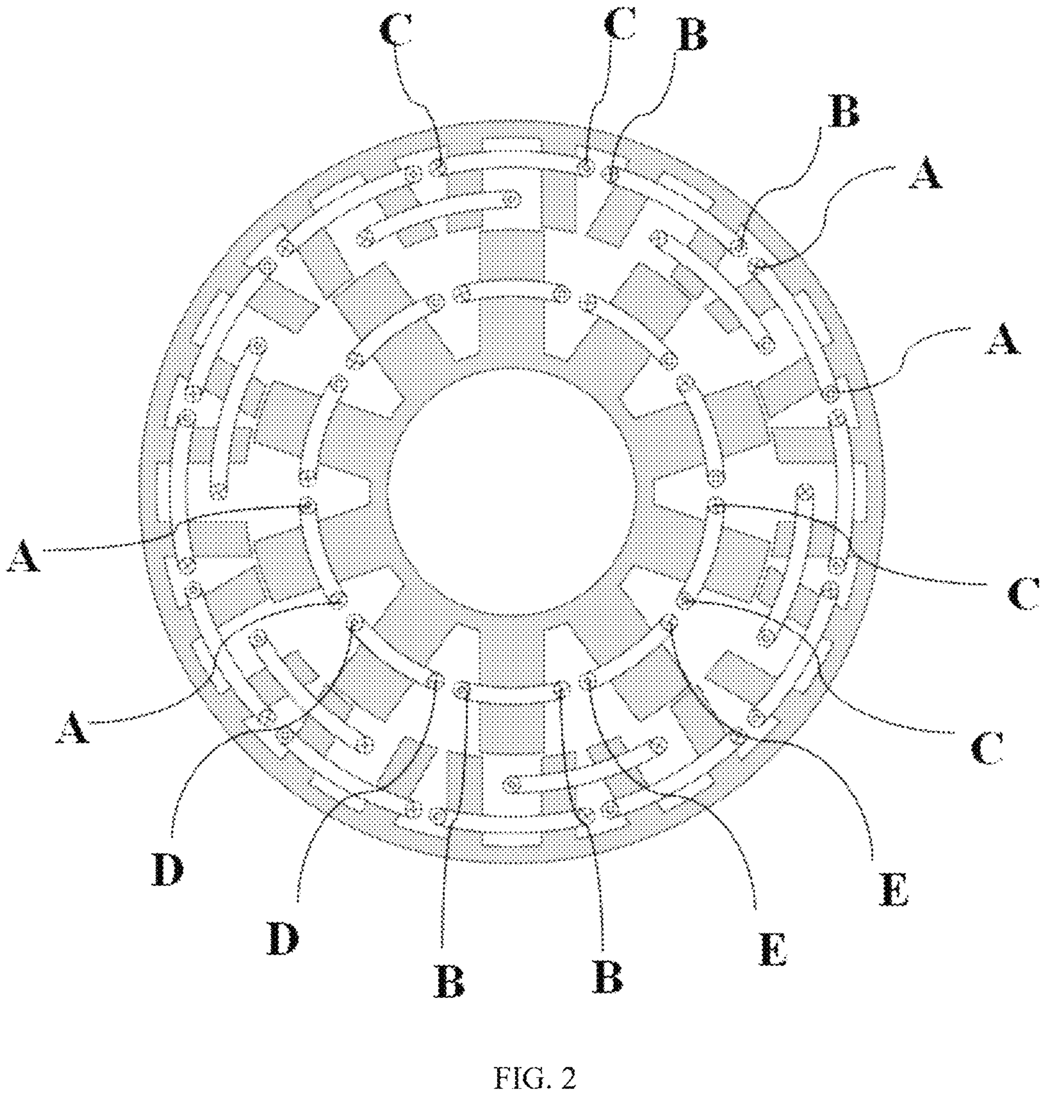
FIG. 2 is a split-phase schematic diagram of stator armature windings and rotor armature windings of the dual-armature flux-switching electrically excited machine in Embodiment 1 of the present disclosure.

The stator core 11 in the embodiment has twenty-four stator slots distributed along a circumferential direction of the stator core. The stator slots include first stator slots 111 and second stator slots 112. The number of the first stator slots 111 for accommodating the field windings 12 is twelve, the number of the second stator slots 112 for accommodating the stator armature windings 13 is twelve, and the first stator slots 111 and the second stator slots 112 are distributed alternately along the circumferential direction. As far as all stator slots are concerned, the field windings 12 are single-layer distributed windings, the stator armature windings 13 are double-layer distributed windings, and the spans between the field windings and the stator armature windings are two, so that the length of the ends is decreased to the maximum extent. Six field windings correspond to six poles. Twelve stator armature coils are circularly divided into three phases along the circumferential direction: phase A, phase B, and phase C, as shown in FIG. 2.

The rotor core 21 in the embodiment has ten rotor slots 210, all configured to accommodate the rotor armature windings 22. The rotor armature windings 22 are double-layer concentrated windings. The ten rotor armature windings are circularly divided into five phases along the circumferential direction: phase A, phase D, phase B, phase E, and phase C as shown in FIG. 2.

Adjacent stator slots in the embodiment are spaced by stator teeth 113, and adjacent rotor slots are spaced by rotor teeth 211. The stator teeth 113 and the rotor teeth 211 all are parallel teeth, tooth widths of all the stator teeth are equal, tooth widths of all the rotor teeth are equal, and the tooth width of each of the stator teeth 113 is greater than a thickness of a stator core yoke 114.

The first stator slots 111 in the embodiment are parallel slots, the second stator slots 112 are trapezoidal slots, the rotor slots 210 all are trapezoidal slots, an area of each of the first stator slots 111 is larger than an area of each of the second stator slots 112, a slot width of each of the first stator slots 111 is greater than a maximum slot width of each of the second stator slots 112, i.e., the width of the bottom of each of the second stator slots 112, and a slot width of each of the second stator slots 112 is less than the tooth width of each of the stator teeth 113. In addition, the tooth width of each of the rotor teeth 211 in the embodiment is slightly greater than the slot width of each of the first stator slots 111. This structure is beneficial to realizing a more sinusoidal counter potential and less cogging torque.

As far as a stator winding process is concerned, the parallel slots with relatively large sizes facilitate winding, and evenly formed coils may be radially mounted. During winding, armature coils with relatively small sizes of corresponding stator slots may be wound first, and then the field windings are wound or mounted. Ends of lead-out armature windings may be arranged along a yoke of the stator core, and ends of the field windings bypass the stator teeth and the ends of the armature windings, so that the armature coils and exciting coils are overlapped with each other.

In a normal operating working condition of the machine, the field windings, the stator armature windings, and the rotor armature windings are in a working state, the field windings are fed with direct currents, and the stator armature windings and the rotor armature windings are fed with alternating currents. In order to maximize the torque when the fixed total copper loss is fixed, on the premise that all the stator slots and rotor slots have the same slot space-factor, the following copper loss distribution relationship is kept: the copper loss of each of the field windings is greater than the copper loss of each of the stator armature windings, and the copper loss of each of the rotor armature windings is greater than the copper loss of each of the stator armature windings. Preferably, the copper loss of each of the field windings is equal to the copper loss of each of the rotor armature windings or is close to the copper loss of each of the rotor armature windings. When the machine operates normally, the current phase angle of the stator armature winding (the stator current phase angle for short) is configured to be 0° to 90°, and the current phase angle of the rotor armature winding (the rotor current phase angle for short) is configured to be −90° to 0°, so as to achieve maximum torque output. Preferably, the current phase angle of each of the rotor armature windings is configured to be −30° to −60°, and the current phase angle of the stator armature windings is configured to be 0° to 20°, so that a large torque is realized. Preferably, a difference between the current phase angle of the stator armature windings and the current phase angle of each of the rotor armature windings is configured to be 40° to 70°. The phase angle is usually defined as an included angle between the alternating current and the corresponding counter potential phase, and a positive value represents that the current is ahead of the counter potential.

In order to realize the maximum torque in the fault-tolerant operation mode, armature current control is different from that in normal operation, including the following three modes:

First mode: when the rotor armature windings are disconnected and the field windings and the stator armature windings work, the current phase angle of the stator armature windings is configured to be 0°;

Second mode: when the stator armature windings are disconnected and the field windings and the rotor armature windings work, the current phase angle of each of the rotor armature windings is configured to be 0°;

The control mode in which the phase angle is configured to be 0° is the simplest, and an output close to the maximum torque can be achieved in the above two modes.

Third mode: when the field windings are disconnected and the stator armature windings and the rotor armature windings work, the current phase angle of the stator armature windings and the current phase angle of each of the rotor armature windings both are kept the same as those during normal work, i.e., the current phase angle of the stator armature windings is configured to be 0° to 20°, the current phase angle of each of the rotor armature windings is configured to be −60° to −30°, and the difference between the current phase angle of the stator armature windings and the current phase angle of each of the rotor armature windings is configured to be 40° to 70°.

In the above three modes, a considerable portion of torque output can be maintained merely by adjusting the current phase angle without adjusting the type and amplitude of the current. In addition, the above-mentioned special stator slot type, the distribution of copper losses of each set of windings, and the current phase angles of each set of windings are essential conditions to realize the maximum torque and synergistic function. As far as normal operation is concerned:

(1) Relatively more copper losses are distributed to the rotor armature windings and relatively fewer copper losses are distributed to the stator armature windings because the rotor portion generates a larger torque in unit copper loss. However, if excessive copper losses are distributed to the rotor armature windings, the maximum torque cannot be realized;

(2) Besides the copper losses of the stator armature windings and the rotor armature windings, a large fraction of copper losses is distributed to the field windings, indicating that the torque numerical value generated in unit copper loss is large. Therefore, a relatively large accommodating space is distributed to the field windings, so that the slot area of each of the first stator slots is set to be larger than the slot area of each of the second stator slots. On this basis, the first stator slots are further designed as parallel slots, which may effectively avoid leakage flux in the slots after the exciting current is increased. According to related research and analysis, the leakage flux in the slots is one of the primary limitations that makes the performance of flux-switching electrically excited machines inferior to that of the same type permanent magnet machine, particularly in high-current working conditions.

(3) After the current phase angle of each of the rotor armature windings is configured to be −90° to 0°, the torque generated by the rotor armature windings and the field windings will be decreased somewhat, but the rotor armature windings can also interact with the stator armature windings to generate the torque. This is a significant improvement. Therefore, compared with a situation that the current phase angle of each of the rotor armature windings is configured to be 0°, it has clear advantage, which is a unique characteristic in this type of machines.

As an example, specific structural parameters and copper loss information of the dual-armature flux-switching electrically excited machine in the embodiment are shown in Table 1.

TABLE 1

Specific structural parameters and copper loss information of the dual-armature flux-switching electrically excited machine

| Parameters | Embodiment 1 | Comparative Example 1 |
|---|---|---|
| Airgap dimension | 0.5 mm | 0.5 mm |
| Axial length | 25 mm | 25 mm |
| Stator outer diameter (radius) | 45 mm | 45 mm |
| Stator inner diameter (radius) | 32.3 mm | 30.83 mm |
| Tooth width of stator | 4.22 mm | 3.8 mm |
| First stator slot width | 7.14 mm | 6.13 mm |
| First stator slot depth | 10.62 mm | 12.55 mm |
| Second stator slot depth | 10.41 mm | 12.26 mm |
| Rotor inner diameter (radius) | 15 mm | 15 mm |
| Tooth width of rotor | 7.8 mm | 7.26 mm |
| Rotor slot depth | 14.61 mm | 11.77 mm |
| Current phase angle of stator | 10° | 0° |
| Current phase angle of rotor | −35° | / |
| Copper loss of stator armature winding | 20 W | 40 W |
| Copper loss of rotor armature winding | 30 W | / |
| Copper loss of field winding | 30 W | 40 W |

Based on the above machine structure, the total copper loss is defined as 80 W. When the copper loss is calculated, the slot-space factors of all the slots are defined as 40% and kept consistent, and the lengths of the ends of all the coils are considered and used for resistance calculation. The proportion of the copper losses of the field windings, the copper losses of the stator armature windings, and the copper losses of the rotor armature windings is set to be 3:2:3, and the torque density in a condition of the fixed total copper loss is maximized. On the premise that the current phase angles of the stator armature windings and the rotor armature windings are simply configured to be 0°, the proportion is also a precondition to realize the maximum torque. At this moment, the torque of the dual-armature flux-switching electrically excited machine has reached 0.99 Nm while the torque of the optimized conventional flux-switching electrically excited machine (i.e., Comparative Example 1) is merely 0.68 Nm. Specific calculation result data is shown in Table 2.

TABLE 2

Comparison on torques of machines in Embodiment 1 and Comparative Example 1

| Parameters | Embodiment 1 | | Comparative Example 1 |
|---|---|---|---|
| Rotating speed | 300 rpm | | 300 rpm |
| Torque in normal operation | 0.99 Nm<br>Current phase angle stator = 0°<br>Current phase angle rotor = 0° | 1.20 Nm<br>Current phase angle of stator = 10°<br>Current phase angle of rotor = −35° | 0.68 Nm<br>Current phase angle of stator = 0° |

As shown in Table 2, the phase angle of the dual-armature flux-switching electrically excited machine is further adjusted. When the current phase angle of the stator is configured to be 10° and the current phase angle of the rotor is configured to be −35°, the torque is further increased to 1.20 Nm. The torque is increased because the stator armature windings and the rotor armature windings generate torque mutually and the stator generates the saliency effect on the rotor. The saliency effect is a factor that has to be considered in the dual-armature flux-switching electrically excited machine, but is greatly affected by a magnetic circuit structure. Saliency torque numerical values in different machines and different structures and corresponding optimal current phase angles of the rotors differ greatly. On the other hand, regardless of the cogging effect, the torque generated by the interaction between the rotor armatures reaches the maximum when the difference between the phase angles thereof is 90°. In full consideration of two torque components, in the embodiment, when the difference between the phase angles is 45°, the torque is optimal. For different machines, the difference between the phase angles is too close to 0° or 90°, which represents that the saliency structure is not efficiently designed.

It should be noted that if the slot types of the first stator slots and the second stator slots are interchanged, on the premise that the areas of the two are invariable and other structural parameters and copper loss information are maintained unchanged, the torque is decreased from 1.20 Nm to 1.00 Nm. The result shows that the first stator slots are parallel slots and the second stator slots are non-parallel slots, which play an extremely important role in maximizing the torque output.

For a scenario in which any type of windings fail or become disconnected, the fault-tolerant operation result is shown in Table 3. In this case, it is apparent that the conventional flux-switching electrically excited machine cannot provide fault-tolerant operation. In contrast, the dual-armature flux-switching electrically excited machine is still capable of fault-tolerant operation after any of the various types of windings fail, and the torque can also be output in three situations without changing the amplitude of the current (the current phase angle is changed at most).

TABLE 3

Comparison on fault-tolerant operation results of machines in Embodiment 1 and Comparative Example 1

| Parameters | Embodiment 1 | | Comparative Example 1 |
|---|---|---|---|
| Rotating speed | 300 rpm | | 300 rpm |
| Fault-tolerant operation torque (Stator armature windings are disconnected) | 0.71 Nm<br>Current phase angle of rotor = −20° | 0.66 Nm<br>Current phase angle of rotor = 0° | 0 Nm |
| Fault-tolerant operation torque (Rotor armature windings are disconnected) | 0.33 Nm<br>Current phase angle of stator = 10° | 0.35 Nm<br>Current phase angle of stator = 0° | / |
| Fault-tolerant operation torque (field windings are disconnected) | 0.41 Nm<br>Current phase angle of stator = 10°<br>Current phase angle of rotor = −35° | | 0 Nm |

When the stator armature windings are disconnected, the maximum torque is 0.71 Nm, which is 59% of that in normal operation and can be realized by reasonably adjusting the phase angle. Alternatively, if the current phase angle of the machine is simply configured to be 0°, the output torque is 0.66 Nm, which is slightly decreased, but has the advantage that the control strategy is relatively simple.

When the rotor armature windings are disconnected, the maximum torque is 0.35 Nm, which is 29% of that in normal operation, and the current phase angle of the rotor is just configured to be 0°.

When the field windings are disconnected and the current phase angle of the stator and the current phase angle of the rotor are kept the same as those in normal operation, i.e., the current phase angle of the stator is configured to be 10° and the current phase angle of the rotor is configured to be −35°, the output of the maximum torque in this case can be guaranteed. The numerical value is 0.41 Nm, which is 34% of that in normal operation.

To sum up, the dual-armature flux-switching electrically excited machine provided by the present disclosure features a higher torque density and a better fault-tolerant capability.

Embodiment 2

The difference between the dual-armature flux-switching electrically excited machine in the embodiment and Embodiment 1 lies in that:

A single side or double sides of the rotor teeth are of a tooth tip structure. The tooth tip structures and dimensions thereof have little influence on the torque, but can further reduce the cogging torque. At this moment, the tooth tip width of the rotor teeth should be slightly greater than the slot width of the first stator slots;

Other structures may refer to Embodiment 1.

Embodiment 3

The difference between the dual-armature flux-switching electrically excited machine in the embodiment and Embodiment 1 lies in that:

The first stator slots and the second stator slots may be different in quantity to fit the probability of different slot/pole combinations, but are required to meet a condition that the second stator slots are on both sides of the first stator slots;

Specifically, other slot/pole combinations and structures may be deformed or expanded with reference to Embodiment 1.

The above is only a detailed description of the preferred embodiments and principles of the present disclosure. For those of ordinary skill in the art, there will be some changes in the specific implementation according to the ideas provided by the present disclosure, and these changes should also be regarded as belonging to the protection scope of the present disclosure.

The invention claimed is:

1. A dual-armature flux-switching electrically excited machine, comprising a stator and a rotor, wherein the stator comprises a stator core, field windings, and stator armature windings, wherein the stator core is provided with stator slots distributed along a circumference of the stator core, the stator slots comprise first stator slots and second stator slots, wherein the second stator slots are provided on both sides of the first stator slots, wherein the first stator slots are configured to accommodate the field windings, and the second stator slots are configured to accommodate the stator armature windings;

wherein the rotor comprises a rotor core and rotor armature windings, wherein the rotor core comprises rotor slots distributed along a circumference of the rotor core, and wherein the rotor slots are configured to accommodate the rotor armature windings;

wherein, when windings are in a working state, the field windings are fed with a direct current, the stator armature windings and the rotor armature windings are fed with an alternating current, a current phase angle of the stator armature windings is configured to be 0° to 90°, and a current phase angle of each of the rotor armature windings is configured to be −90° to 0°; and wherein the first stator slots are parallel slots, the second stator slots are non-parallel slots. and an area of each of the first stator slots is larger than an area of each of the second stator slots.

2. The dual-armature flux-switching electrically excited machine according to claim 1, wherein the current phase angle of the stator armature windings is configured to be 0° to 20°, and the current phase angle of each of the rotor armature windings is configured to be −60° to −30°.

3. The dual-armature flux-switching electrically excited machine according to claim 2, wherein a difference between the current phase angle of the stator armature windings and the current phase angle of each of the rotor armature windings is configured to be 40° to 70°.

4. The dual-armature flux-switching electrically excited machine according to claim 1, wherein a copper loss of each of the field windings is greater than a copper loss of each of the stator armature windings, and a copper loss of each of the rotor armature windings is greater than the copper loss of each of the stator armature windings.

5. The dual-armature flux-switching electrically excited machine according to claim 4, wherein the copper loss of each of the field windings is equal to the copper loss of each of the rotor armature windings.

6. The dual-armature flux-switching electrically excited machine according to claim 4, wherein the adjacent stator slots are spaced by stator teeth, and the stator teeth are parallel teeth same in width; and wherein a slot width of each of the first stator slots is greater than a tooth width of each of the stator teeth, and the tooth width of each of the stator teeth is greater than a maximum yoke thickness of the stator core.

7. The dual-armature flux-switching electrically excited machine according to claim 6, wherein the slot width of each of the first stator slots is greater than a maximum slot width of each of the second stator slots, and a notch width of each of the second stator slots is less than the tooth width of each of the stator teeth.

8. The dual-armature flux-switching electrically excited machine according to claim 1, wherein the adjacent rotor slots are spaced by rotor teeth, and the rotor teeth are parallel teeth; and a tooth tip width of each of the rotor teeth is greater than the slot width of each of the first stator slots.

9. The dual-armature flux-switching electrically excited machine according to claim 1, wherein when the rotor armature windings are disconnected and the field windings and the stator armature windings work, the current phase angle of the stator armature windings is configured to be 0°;

when the stator armature windings are disconnected and the field windings and the rotor armature windings work, the current phase angle of each of the rotor armature windings is configured to be 0°; and when the field windings are disconnected and the stator armature windings and the rotor armature windings work, the current phase angle of the stator armature windings is configured to be 0° to 20°, the current phase angle of each of the rotor armature windings is configured to be −60° to −30°, and the difference between the current phase angle of the stator armature windings and the current phase angle of each of the rotor armature windings is configured to be 40° to 70°.

* * * * *